United States Patent
Hopkins

(10) Patent No.: US 6,869,559 B2
(45) Date of Patent: Mar. 22, 2005

(54) MATERIAL AND METHOD FOR THREE-DIMENSIONAL MODELING

(75) Inventor: Paul E. Hopkins, Savage, MN (US)

(73) Assignee: Stratasys, Inc., Eden Prairie, MN (US)

( * ) Notice: Subject to any disclaimer, the term of this patent is extended or adjusted under 35 U.S.C. 154(b) by 73 days.

(21) Appl. No.: 10/429,675

(22) Filed: May 5, 2003

(65) Prior Publication Data

US 2004/0222561 A1 Nov. 11, 2004

(51) Int. Cl.[7] .................. B29C 41/02; B29C 71/02; C08F 283/00; H05B 6/64
(52) U.S. Cl. .................. 264/489; 264/308; 264/317; 264/234; 525/461
(58) Field of Search .................. 264/234, 308, 264/317, 489; 525/461

(56) References Cited

U.S. PATENT DOCUMENTS

| | | | |
|---|---|---|---|
| 4,152,367 A | * | 5/1979 | Binsack et al. .............. 525/461 |
| 5,503,785 A | | 4/1996 | Crump et al. |
| 6,127,492 A | * | 10/2000 | Nagashima et al. ........ 525/461 |
| 2001/0030383 A1 | | 10/2001 | Swanson et al. |
| 2002/0017743 A1 | | 2/2002 | Priedman, Jr. |

FOREIGN PATENT DOCUMENTS

WO  WO 00/78519 A1  12/2000

* cited by examiner

*Primary Examiner*—Leo B. Tentoni
(74) *Attorney, Agent, or Firm*—Kinney & Lange, P.A.

(57) ABSTRACT

The present invention is a modeling technique wherein a three-dimensional model and its support structure are built by fused deposition modeling, using a thermoplastic blended material containing a polyphenylsulfone (PPSF) polymer and a polycarbonate (PC) polymer to form the model. The PPSF/PC blend exhibits good chemical resistance, thermal stability, and resists build-up in the nozzle of a three-dimensional modeling apparatus. Removal of the support structure from a completed model is facilitated by operating on the material while it is hot.

43 Claims, 1 Drawing Sheet

MATERIAL AND METHOD FOR THREE-DIMENSIONAL MODELING

CROSS-REFERENCE TO RELATED APPLICATION(S)

None.

BACKGROUND OF THE INVENTION

This invention relates to the fabrication of three-dimensional objects using additive process modeling techniques. More particularly, the invention relates to forming three-dimensional objects by depositing a first solidifiable material in a predetermined pattern so as to form a three-dimensional object, in coordination with the depositing of a second solidifiable material so as to provide a support structure for the three-dimensional object as it is being built.

Additive process modeling machines make three-dimensional models by building up a modeling medium, based upon design data provided from a computer aided design (CAD) system. Three-dimensional models are used for functions including aesthetic judgments, proofing the mathematical CAD model, forming hard tooling, studying interference and space allocation, and testing functionality. One technique is to deposit solidifiable modeling material in a predetermined pattern, according to design data provided from a CAD system, with the build-up of multiple layers forming the model.

Examples of apparatus and methods for making three-dimensional models by depositing layers of solidifiable modeling material from an extrusion head are described in Valavaara U.S. Pat. No. 4,749,347; Crump U.S. Pat. No. 5,121,329; Batchelder, et al. U.S. Pat. No. 5,303,141; Crump U.S. Pat. No. 5,340,433; Batchelder, et al. U.S. Pat. No. 5,402,351; Crump, et al. U.S. Pat. No. 5,503,785; Batchelder, et al. U.S. Pat. No. 5,764,521; Danforth, et al. U.S. Pat. No. 5,900,207; Batchelder, et al. U.S. Pat. No. 5,968,561; Stuffle, et al. U.S. Pat. No. 6,067,480; and Batchelder et al. U.S. Pat. No. 6,238,613; all of which are assigned to Stratasys, Inc., the assignee of the present invention. The modeling material may be supplied to the extrusion head in solid form, for example in the form of a flexible filament wound on a supply reel or in the form of a solid rod, as disclosed in U.S. Pat. No. 5,121,329. As described in U.S. Pat. No. 4,749,347, modeling material may alternatively be pumped in liquid form from a reservoir. In any case, the extrusion head extrudes molten modeling material from a nozzle onto a base. The extruded material is deposited layer-by-layer in areas defined from the CAD model. A solidifiable material which adheres to the previous layer with an adequate bond upon solidification is used as the modeling material. Thermoplastic materials have been found particularly suitable for these deposition modeling techniques.

Another layered-deposition technique for building models from a solidifiable material deposits droplets of modeling material from nozzles of a jetting head. Examples of apparatus and methods for making three-dimensional models by depositing layers of solidifiable modeling material from a jetting head are described, for example, in U.S. Pat. No. 5,136,515 to Helinski et al., and U.S. Pat. No. 6,193,923 to Leyden et al.

In filament-fed Stratasys FDM® three-dimensional modeling machines of the current art, a filament strand of the modeling material (or support material) is advanced by a pair of motor-driven feed rollers into a liquifier carried by the extrusion head. Inside the liquifier, the filament is heated to a flowable temperature. The liquifier is pressurized by the "pumping" of the strand of filament into the liquifier by the feed rollers. The strand of filament itself acts as a piston, creating a pump. As the feed rollers continue to advance filament into the extrusion head, the force of the incoming filament strand extrudes the flowable material out from the dispensing nozzle where it is deposited onto a substrate removably mounted to a build platform. Stratasys FDM® three-dimensional modeling machines of the current art use as the modeling material acrylonitrile-butadiene-styrene (ABS) thermoplastic, a wax material, or polycarbonate.

In creating three-dimensional objects by additive process techniques, such as by depositing layers of solidifiable material, it is the rule rather than the exception that supporting layers or structures must be used underneath overhanging portions or in cavities of objects under construction, which are not directly supported by the modeling material itself. For example, if the object is a model of the interior of a subterranean cave and the cave prototype is constructed from the floor towards the ceiling, then a stalactite will require a temporary support until the ceiling is completed. Support layers or structure may be required for other reasons as well, such as allowing the model to be removed from a base, resisting a tendency for the model to deform while partially completed, and resisting forces applied to a partially completed model by the construction process.

A support structure may be built utilizing the same deposition techniques and apparatus by which the modeling material is deposited. The apparatus, under appropriate software control, produces additional geometry acting as a support structure for the overhanging or free-space segments of the object being formed. Support material is deposited either from a separate dispensing head within the modeling apparatus, or by the same dispensing head that deposits modeling material. The support material is chosen so that it removably adheres to the modeling material. Also, as the support material typically is used to create base layers of deposited material upon which the model is built, the support material should likewise removably adhere to the modeling substrate. Building support structures solves the problem of supporting the model, but creates the additional problem of removing the support structure from the finished model without causing damage to the model.

The problem of removing the support structure has been addressed by forming a weak, breakable bond between the model and the support structure, such as is described in U.S. Pat. No. 5,503,785. The '785 patent discloses a process by which a material that forms a weak, breakable bond with the modeling material is selected as either a support material or a release coating. Support material is deposited in layered fashion at the interface between the object and its support structure, or it is deposited in a layered fashion to form the support structure, in either case permitting the supports to be broken away after formation of the object. Support structures that must be broken apart from the object after it is built are known as "break-away" supports. Additionally, soluble support materials are known, which wash away in a bath. Stratasys, Inc. offers a material disclosed in pending U.S. patent application Ser. No. 10/019,160, sold under the name Waterworks™, for creating a soluble support structure.

Various styles of applying support material in layers are known. For example, the support material may be applied in short bead segments, termed "perforations", where the support structure interfaces with the model under construction. The perforations reduce adhesion of the supports by limiting the area of contact with the model, aiding in the removal of breakaway supports. Also, layers of the support material may be interwoven with layers of the modeling material in building the support structure, a technique termed "composite supports". The composite supports are weaker and therefore break apart more easily than homogenous supports.

Another technique builds up support structures as an array of hollow rectangular pillars, having no side-by-side connection except that each is capped on the top by an interface layer or layers and capped on the bottom by a base layer or layers. This style, known as "box supports", has the advantage of breaking off in sections once the base layer is removed, but has the disadvantage of a longer build time.

Apparatus and methods for building three-dimensional models by layered deposition of high-temperature engineering thermoplastics are disclosed in Swanson et al., U.S. patent application Ser. No. 09/804,401, filed on Feb. 27, 2001, and issued as U.S. Pat. No. 6,776,602 on Aug. 17, 2004 (herein "the '602 patent"); and Swanson et al., U.S. patent application Ser. No. 10/018,673, filed on Dec. 13, 2001, and issued as U.S. Pat. No. 6,722,872 on Apr. 20, 2004 (herein "the '872 patent"); which are assigned to Stratasys, Inc. These applications disclose the use of polycarbonate, polyetherimides, amorphous polyamides and sulfones for building three-dimensional models. Of these, only polycarbonate has been commercially implemented.

There is a continuing need to improve model strength and quality, by building models from high-performance engineering thermoplastics. Support structures for models made from such thermoplastics must withstand a high temperature environment and must be removable from the completed models.

BRIEF SUMMARY OF THE INVENTION

The present invention is a thermoplastic material forming a modeling filament comprising a blend of polyphenylsulphone (PPSF) as a major component, and polycarbonate (PC) as a minor component, a method for building a three-dimensional model by layered deposition modeling using the thermoplastic material, and a method for removing supports from a completed model built from the material. A method according to the present invention employs the PPSF/PC blend thermoplastic material as a modeling material for building a three-dimensional model. The PPSF/PC blend thermoplastic material exhibits good thermal stability, resists build-up in the nozzle of a three-dimensional modeling apparatus, has very high chemical resistance, and models made from this material exhibit good strength.

Modeling with the high-temperature engineering thermoplastic of the present invention requires use of a support material that is compatible with a high-temperature build environment. Due to the strength of suitable support materials, a hot support removal technique is utilized. Operating on the material while it is hot eases removal of the support structure from the completed model.

DETAILED DESCRIPTION

Figure 1:
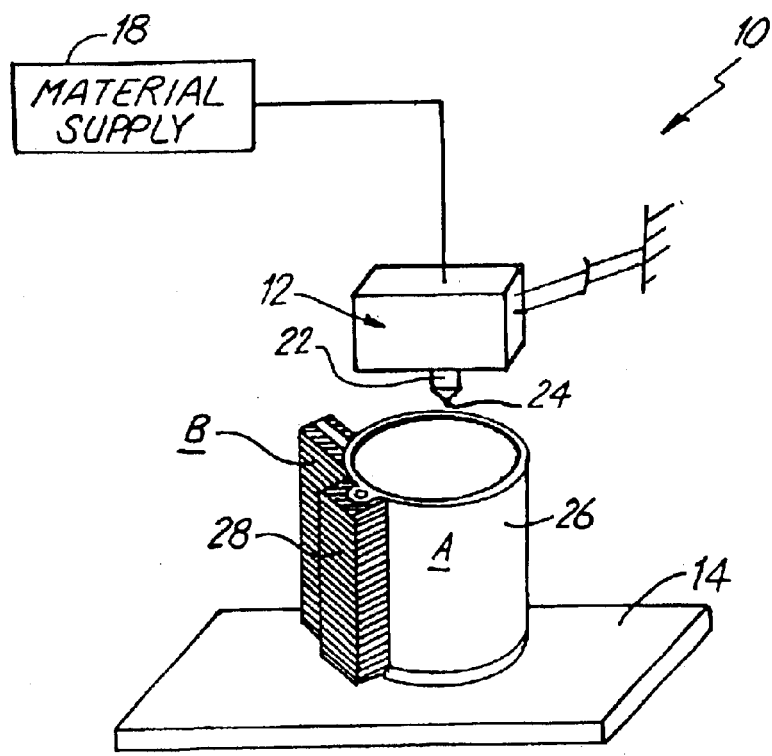
FIG. 1 is a diagrammatic illustration of a model and a support structure therefor formed using layered extrusion techniques.

The present invention is described with reference to a deposition modeling system of the type shown in FIG. 1. FIG. 1 shows an extrusion apparatus 10 building a model 26 supported by a support structure 28 according to the present invention. The extrusion apparatus 10 includes an extrusion head 12, a material-receiving base 14 and a material supply 18. The extrusion head 12 moves in X and Y directions with respect to the base 14, which moves in a vertical Z direction. The material supply 18 supplies a feedstock of material to the extrusion head 12. In the described embodiment, a solid feedstock of material is supplied to the extrusion head 12, and is melted in a liquifier 22 carried by the extrusion head 12. The liquifier 22 heats the feedstock material to a temperature slightly above its solidification point, reducing it to a molten state. Molten material is extruded through an orifice 24 of the liquifier 22 onto the base 14. The feedstock may take the form of a continuous filament, rods, slugs, pellets, granulations or the like.

The movement of the extrusion head is controlled so as to deposit material onto the base 14 in multiple passes and layers to build the three-dimensional model 26 and further to build the support structure 28 defined so as to physically support the model 26 as it is being built. The model 26 and its support structure 28 are built up on the base 14 within a build chamber (not shown) having an environment controlled so as to promote thermal solidification. Several base layers of the deposited material adhere to the base 14 so as to form a foundation on which the model is built.

A modeling material A is dispensed to form the model 26, and a support material B is dispensed in coordination with the dispensing of modeling material A to form the support structure 28. For convenience, the extrusion apparatus 10 is shown with only one material supply 18. It should be understood, however, that in the practice of the present invention, the modeling material A and the support material B are provided to the extrusion apparatus 10 as separate feedstocks of material from separate material supplies. The extrusion apparatus 10 may then accommodate the dispensing of two different materials by: (1) providing two extrusion heads 12, one supplied with modeling material A and one supplied with support material B (such as is disclosed in the Batchelder '561 patent); (2) providing a single extrusion head supplied with both the modeling material A and the support material B, with a single nozzle for dispensing both materials (such as is shown in FIG. 6 of the Crump '329 patent); or (3) providing a single extrusion head supplied with both materials, with each material dispensed through a separate nozzle (such as shown in FIG. 6 of the Crump '785 patent).

In the described embodiment, the modeling material A and the support material B are deposited as substantially continuous "roads" in horizontal layers from an extrusion head, and are supplied to the extrusion head in solid form. It will be understood by those skilled in the art that the invention may be practiced with advantage in various other types of modeling machines as well, including those that employ a jetting head, and that the materials may alternatively be supplied to the extrusion head in liquid form. Also, while the support structure 28 as shown is built from the support material B deposited in a raster pattern, it will be understood by those skilled in the art that any number of build styles may be used to build the support structure.

Rheology of Modeling and Support Materials

The modeling material A and support material B must satisfy a large number of modeling criteria for the particular modeling system in which they are used, relating generally to thermal properties, strength, viscosity and adhesion.

The modeling material A and support material B must have a melt viscosity suitable for the modeling process. Ideally, materials used for fused deposition modeling have low melt viscosity. The melt viscosity must be low enough at the extrusion temperature so that it can be extruded as a generally continuous road or bead. Also, the melt viscosity at the extrusion temperature must be low enough so that deposited roads or beads of material have little melt strength, allowing them to lay flat rather than curl up. Melt viscosity is lowered by increasing the temperature at which the material is extruded. Too high an extrusion temperature, however, can cause heated material sitting idle in the extruder to decompose. If decomposed, in the case of a filament-pump extruder that has no positive cut-off mechanism, the materials will drain uncontrollably from the liquifier into the build envelope, a condition referred to as "ooze". Further, a lower extrusion temperature reduces energy consumption, reduces heat generation and reduces the opportunity to degrade polymeric material.

In theory, the viscosity of a melt is related to the molecular weight of the material, and as it approaches the critical molecular weight, properties diminish. So, the lower limit on melt viscosity is defined as that at the critical molecular weight, but virtually all commercial grade polymers exceed the critical molecular weight to deliver good physical properties.

Melt viscosity may be measured by its inverse parameter, melt flow. A material used to build models in a Stratasys FDM® modeling machine which has a filament-pump extruder must have a high melt flow at the extrusion temperature, so as to be extruded as a continuous bead under a relatively low pressure of about 3000 psi or less. A desirable high melt flow for material deposited by a filament-pump type extruder is greater than about 5 gms/10 minutes, as measured by ASTM D1238, under a load of 1.2 kg at the extrusion temperature. Most preferably, the melt flow is between 5–30 g/10 minutes. A lower melt flow (higher viscosity) is suitable for high pressure extrusion, such as by the apparatus disclosed in U.S. Pat. No. 6,067,480.

A compatible support material for use in the modeling method is selected based upon various physical, thermal and rheological properties demanded by the deposition modeling process. To properly support the model under construction, the support material B must bond to itself (self-laminate). Where the support material is used to create base layers, the support material must additionally bond to the substrate. A support material is further chosen based upon the strength of the bond it will have the modeling material. The bond between the support material and modeling material must be strong enough to secure the model in place during its formation, but weak enough to permit removal of the support structure from the completed model without causing damage to the model.

To produce a dimensionally accurate model, the modeling and support materials must exhibit little shrinkage upon cooling in the conditions of the build envelope. Any shrinkage of the support material B must be similar to that of the modeling material A. A shrink differential in the materials would cause stresses and bond failures along the model/support structure joint. Amorphous polymers typically have a shrinkage upon solidification of less than or equal to 0.010 inch/inch according to ASTM injection-molding test standards. The shrinkage characteristic of amorphous polymers is acceptable for deposition modeling purposes, while crystalline polymers exhibit shrinkage too high for deposition modeling. Fillers may be added to the materials to reduce shrinkage. Crystalline additives may be added to the materials of the present invention, so long as they are added in an amount small enough so that the materials continue to exhibit the shrinkage characteristic of an amorphous polymer.

Selection of a particular modeling material A can be made according to the particular application of the finished model. The support material B must have sufficient mechanical strength in solid form to provide support to a model during its formation. The support material B must resist forces by the modeling material A, or the model will exhibit undesirable curling and deformation.

The modeling material A and support material B, when supplied in filament or rod form, must be strong enough to be shipped without breaking. When supplied in filament form, the materials must further have the strength and flexibility to be formed into a filament, be spooled and unspooled, and be fed through the extrusion apparatus without breakage. Similarly, materials supplied in filament form must have sufficient rigidity to not be deformed by compressive forces during feeding through the extrusion apparatus.

As to thermal properties, the modeling material A and support material B should have similar heat deflection properties, so that both materials can successfully be extruded into the same build chamber. As taught in U.S. Pat. No. 5,866,058, building the model in a chamber heated to a temperature higher than the solidification temperature of the thermoplastic or other thermally solidifiable modeling material, followed by gradual cooling, relieves stresses from the material. The stresses are annealed out of the model while is being built so that the finished model is stress free and has very little distortion. As is further taught in the '058 patent, a modeling material should have a glass transition temperature ($T_g$) higher than the temperature of the build chamber, so that the model does not become so weak that it droops. The preferred temperature of the build chamber is thus in a range between the solidification temperature of modeling material A and its creep relaxation temperature (creep relaxation temperature is defined as the point at which the stress relaxation modulus has dropped by a factor of ten from its low temperature limit). Likewise, the glass transition temperature of the support material B should be higher than the temperature of the build chamber, so that the support structure will not deform and will maintain structural fidelity of the model that it supports. It has been discovered through experimentation that the glass transition temperature (or heat deflection temperature) of the support material B should be within about 20° C. of the of the modeling material A, preferably within 15° C. The addition of fillers to the materials can have the effect of raising a material's glass transition temperature.

In a given build process, the material used for forming the model will desirably have properties that are superior to those of the material used to form its support structure (e.g., greater strength and toughness).

Testing of Materials

The following are examples of material formulations which were tested in a very high-temperature modeling environment (i.e. build chamber temperature of 200° C. or greater). The particular modeling machine used was a Stratasys FDM® Titan™. In each case, the modeling material was polyphenylsulfone (PPSF) or a polyphenylsulfone blend. Polyphenylsulfone is a particularly desirable material for modeling, in that it is strong and has high thermal and chemical resistance. Specifically, the polyphenylsulfone tested was Radel® R 5600 NT (available from Solvay Advanced Polymers, L.L.C.). This polyphenylsulfone resin has a glass transition temperature of 236° C., a heat deflection temperature (at 264 psi) of 207° C., a tensile strength of 10,100 psi, and a melt flow in the range of 20–30 gms/10 min. at 400° C. under a 1.2 kg load. Example 4 embodies the present invention, while Examples 1, 2 and 3 are comparative examples.

All of the materials tested met the rheology criteria discussed above. In each case, techniques conventional in polymer chemistry were used to compound the component materials. The exemplary materials were successfully formed into modeling filament of a very small diameter, on the order of 0.070 inches, and used in a filament-fed deposition modeling machine. Materials according to the examples given were tested using filament-fed layered deposition modeling machines of the type disclosed in the '602 patent and the '872 patent, which are hereby incorporated by reference as if set forth fully herein.

EXAMPLE 1

Test models were built in an oven (i.e. build chamber) having a temperature of about 200–225° C., using the polyphenylsulfone modeling material and a support material which comprised various resins of polyethersulfone, polyphenylsulfone or polyetherimide (i.e., Ultem™). These support materials exhibited favorable thermal stability, but could not be broken away from the model. The support material containing polyphenylsulfone adhered very strongly to the model. The support material containing polyetherimide adhered fairy strongly to the model, and the support material containing polyethersulfone, while exhibiting the least adherence to the model, adhered too strongly for suitable use.

Also, the materials of this example exhibited an undesirable build-up in the Liquifier. After extrusion of only about 7 pounds of material, the liquifier needed replacement due to clogging.

EXAMPLE 2

Large and small polyphenylsulfone models were built in an oven having a temperature of about 200–225° C., using a support material comprising a polyethersulfone base polymer and a silicone release agent. For convenience, commercially available compounds were used to provide a "masterbatch" containing silicone, which was compounded with the base polymer. Various masterbatches were tested, which included polypropylene, linear low-density polyethylene, and high-impact polystyrene. Additionally, various silicones were tested, ranging in viscosity from about 60,000 centistokes (intermediate viscosity) to 50 million centistokes (very high viscosity). The very high viscosity silicones have a high molecular weight, while the lower viscosity silicones have a lower molecular weight.

It was found that intermediate viscosity silicone was a much better release agent than the very high viscosity silicone, and that the high-impact polystyrene masterbatch released more easily from the polyphenylsulfone modeling material than did the other masterbatches tested. In a preferred embodiment, the masterbatch contained about 75 weight percent of a high-impact polystyrene copolymer and about 25 weight percent of a 60,000 centistoke (cSt) viscosity silicone. In this embodiment, the support material comprised between about 90–95 weight percent polyethersulfone, between about 3–8 weight percent high-impact polystyrene, and between about 1–3 weight percent silicone. This composition was demonstrated using BASF, Ultrason E-1010 polyethersulfone and Dow-Corning MB25-504 styrene butadiene copolymer containing hydroxy-terminated poly dimethyl siloxane (i.e. hydroxy-terminated silicone). This material was extruded from a liquifier having a temperature of about 420° C. to successfully form a support structure for a model built using the polyphenylsulfone resin. The support structure satisfactorily released from the model after its construction.

Additionally, the silicone additive was demonstrated to increase liquifier life. Without the silicone additive (e.g., the support material of Example 1), the liquifier needed replacement due to material built-up in the nozzle after extrusion of about 7 pounds of support material. With the silicone additive, the liquifier extruded over 40 pounds of support material before needing replacement. Nozzle life was thus extended by over 400 percent.

Regarding the polyphenylsulfone modeling material, it was observed that large models (i.e. approximately 100 cubic inches or greater) made from this material cracked almost immediately upon removal from the oven. The cracking was most severe in thick sections. Small models also exhibited some cracking, primarily in sharp corners.

EXAMPLE 3

Large and small polyphenylsulfone models were built in an oven having a temperature of about 200–230° C., using the support material consisting of polyethersulfone, high-impact polystyrene and a silicone release agent, as described in Example 2. In this example, silicone was added to the PPSF resin as well. Various concentrations of silicone were tested, up to about 5 weight percent silicone, using various masterbatches.

It was found that the silicone additive marginally increased liquifier life, from about 7 pounds of extruded modeling material to about 10 pounds. The silicone additive likewise marginally improved releasability of the model from its support structure.

EXAMPLE 4

In this example, a polycarbonate polymer was blended with the polyphenylsulfone polymer. The polycarbonate used was Lexan® HAF 1110 (available from General Electric Plastics). This material has a glass transition temperature of 156° C., and has been demonstrated to flow well through the nozzle when run at liquifier temperatures of about 320–340° C. Various concentrations of polycarbonate were tested, ranging from 5 to 75 weight percent.

Large and small models were built from the PPSF/PC blend modeling material, using the support material consisting of polyethersulfone, high-impact polystyrene and a silicone release agent, as described in Example 2. The PPSF/PC blend modeling material was extruded from a liquifier having a temperature of about 400–430° C., into an oven maintained at between 200–235° C., with 225° C. being the preferred temperature. In an effort to ease support removal, the support were removed from the model while the material was still hot. Details of this hot support removal technique are set forth below.

The PPSF/PC material was found to resist build-up in the nozzle of the extrusion head liquifier. Surprisingly, the polycarbonate did not break down in the high temperature of the liquifier. About 30 pounds of material were extruded before the liquifier needed replacement. Moreover, the models built from the PPSF/PC material did not exhibit the stress cracking which occurred in the models built from straight PPSF. And, the additional of up to between 20 and 25 weight percent polycarbonate made no appreciable change in the thermal, chemical or strength properties of the PPSF polymer. The 10 percent polycarbonate blend was preferred as it was a sufficient amount of the polycarbonate polymer to readily produce a uniform blend, while having very little impact on the desirable PPSF properties.

The thermal and mechanical properties of the PPSF/PC blend (10 weight percent polycarbonate) were measured as follows:

| PPSF/PC PROPERTIES | | | |
|---|---|---|---|
| THERMAL PROPERTIES | ENGLISH UNITS | SI UNITS | TEST METHOD |
| HDT, 264 psi | 372° F. | 189° C. | ASTM D648 |
| Tg | 446° F. | 230° C. | 2/30/03 DMA |
| Tensile Strength | 8,000 psi | 55 MPa | ASTM D638 |
| Tensile Modulus | 300,000 psi | 2068 MPa | ASTM D638 |
| Tensile Elongation | 3% | 3% | ASTM D638 |
| Flexural Strength | 15,900 psi | 110 MPa | ASTM D790 |
| Flexural Modulus | 320,000 psi | 2206 MPa | ASTM D790 |
| Izod Impact, notched (73° C.) | 1.1 Ft-lb/in | 59 J/m | ASTM 256 |

Discussion of Results

It was demonstrated that adding polycarbonate to the PPSF base polymer results in a modeling material having similar thermal and strength properties of PPSF, but which exhibits resistance to build-up in the extrusion head nozzle and which creates strong, crack-free models. Hence, the polycarbonate polymer was demonstrated to provide the PPSF thermoplastic with characteristics suitable for commercial use. It is expected that the addition of as little as one weight percent polycarbonate or as much as about 25 weight percent could be used to provide a commercially useful PPSF modeling material. With up to 25 weight percent polycarbonate, the thermal properties of the blend will be lowered somewhat, necessitating a slight reduction in the preferred oven temperature (perhaps to between about 215–220° C.). It is also expected that adding a small amount of silicone to the PPSF/PC blend material would further increase liquifier life.

Regarding the support structure, it was found that the support structure was much more easily removed from the completed model when the material was hot out of the oven than when the material had cooled. Removing the supports while hot reduces the effort required to break the supports away from the model. In the prior art, the part and its supports were allowed to cool to a comfortable temperature before handling. Due to the high strength of the high-temperature support materials, breaking away the supports when cool is more difficult in the present materials than in the commercial systems of the prior art. The hot support removal technique enables break-away of the high-strength supports with greater ease than the cold break-away of lower-strength supports known in the prior art. The heat makes the support material more flexible and less brittle, which makes it easier to pull the support off the model. The heat also decreases the strength of the bond between the PPSF modeling material and its supports. For the materials of Example 4, it was found that the best temperature range for support removal was 150° C. to 220° C.

While a support material consisting of polyethersulfone, high-impact polystyrene and a silicone release agent was used in demonstrating the present invention, such material is but one example of a thermoplastic material which may be used as a support material in the present invention and which would benefit from the hot support removal technique.

As will be recognized by those skilled in the art, the PPSF/PC modeling material may include inert and/or active filler materials. The fillers can provide enhanced material properties which may be desirable depending upon the intended use of the resulting model. For instance, fillers can provide RF shielding, conductivity, or radio opaque properties (useful for some medical applications). Fillers can alternatively degrade material properties, but this may be acceptable for some uses. For instance, an inexpensive filler can be added to decrease the cost of material. Fillers can also change thermal characteristics of the materials, for instance a filler can increase the heat resistance of a material, and a filler can reduce material shrinkage upon thermal solidification. Exemplary fillers include glass fibers, carbon fibers, carbon black, glass microspheres, calcium carbonate, mica, talc, silica, alumina, silicon carbide, wollastonite, graphite, metals, salts and clay nanocomposites.

Those skilled in the art will recognize that innumerable other additives may also be to modify material properties as desired for particular applications. For instance, the addition of a plasticizer will lower the heat resistance and melt flow of a thermoplastic material. The addition of dyes or pigments can be done to change color. An antioxidant can be added to slow down heat degradation of material in the extruder. It is expected that up to about 20 weight percent of additive materials may be added without significantly degrading the material.

The PPSF/PC modeling material of the present invention may be molded into filament, rods, pellets or other shapes for use as a modeling feedstock, or it may be used as a liquid feedstock without prior solidification. Alternatively, the mixture may be solidified and then granulated.

It is noted that the PPSF/PC modeling material is moisture sensitive. It has been demonstrated that exposure of this material to a humid environment will significantly degrade model quality, thus, maintaining dry conditions is important. In order for the materials of the present invention to build accurate, robust models by fused deposition techniques, the material must dried. Particularly suitable apparatus for building up three-dimensional objects using the high temperature, moisture-sensitive materials of the present invention are disclosed in the '602 patent and the '872 patent, which are incorporated by reference herein. The '872 patent (i.e., the '673 application) discloses a modeling machine having a high-temperature build chamber, and the '602 patent (i.e., the '401 application) discloses a moisture-sealed filament cassette and filament path for supplying moisture-sensitive modeling filament in a filament-fed deposition modeling machine.

Hot Support Removal Technique

Supports are more easily removed from a model built according the present invention when the part is just built and the materials are still hot. The model with its attached supports is removed from the oven of the modeling machine while it is hot, and the user (wearing heat protective gloves) pulls and breaks away the supports using various hand tools. If the material cools so that the break-away becomes more difficult, the user re-heats the part in the modeling machine oven or other available oven. The time to reheat will depend on the oven and the geometry of the part. In the oven of a Titan™ machine, the part will re-heat in from about 4 to 15 minutes. Other types of ovens that can be used in heating up the part include a microwave oven, home convection oven, laboratory oven, or a hot air gun. A microwave oven can quickly heat the part, but the user must be careful not to overheat the material and melt the model.

Generally, support removal is easiest if base layers are removed first, followed by the internal support structures, and then the layers that interface with the model. Various hand tools are useful in removing supports, including a pliers, a straight chisel, a hook chisel, an awl, a hook awl, and a gouge. The pliers is used to remove as much support structure as possible. The straight chisel is particularly useful for removing the interface layers, by wedging the tool between the model and the support face, and pushing the tool, bevel down, along the model surface. The hook chisel can be used for support removal in locations that cannot be reached by the straight chisel, by hooking a support edge and pulling. The awl is used in removal of supports from areas that are too small for the straight chisel to reach. The hook awl is used in the same way as the hook chisel, and also can be used to create a line of removed support, by hooking a support edge and pulling the tool through the support. Finally, the gouge is used to remove supports from holes and concave features.

Although the present invention has been described with reference to preferred embodiments, workers skilled in the art will recognize that changes may be made in form and detail without departing from the spirit and scope of the invention.

What is claimed is:

1. An additive-process method for building a three-dimensional object, comprising the step of:

depositing layers of a molten thermoplastic modeling material, the modeling material consisting essentially of a blend of polyphenylsulfone, polycarbonate, and, optionally, additives, wherein the weight percent of polyphenylsulfone in the blend is between about 70 percent and 99 percent, and the weight percent of polycarbonate in the blend is between 1 percent and 25 percent.

2. The method of claim 1, wherein the weight percent of polycarbonate in the blend is about 10 percent and the weight percent of polyphenylsulfone in the blend is least 80 percent.

3. The method of claim 2, wherein the weight percent of polyphenylsulfone in the blend is about 90 percent.

4. The method of claim 1, wherein the blend has a glass transition temperature of greater than 220° C.

5. In a method for making a three-dimensional model by dispensing a modeling material in molten form at a first elevated temperature in a predetermined pattern so as to define the three-dimensional object in coordination with dispensing of a support material in molten form at a second elevated temperature so as to define a support structure for the three-dimensional model, the improvement comprising the step of:

providing as the modeling material a thermoplastic consisting essentially of a blend of polyphenylsulfone, polycarbonate, and, optionally, additives, wherein the weight percent of polyphenylsulfoflein the blend is between about 70 percent and 99 percent, and the weight percent of polycarbonate in the blend is between 1 percent and 25 percent.

6. The method of claim 5, wherein the thermoplastic modeling material is provided in the form of a flexible filament.

7. The method of claim 5, wherein the materials are dispensed into a heated build chamber and further comprising the step of:

removing the support structure from the model by breaking-away the support structure from the model while the materials are heated to a temperature above about 150° C.

8. The method of claim 5, wherein the materials are dispensed into an environment heated to at least about 200° C.

9. The method of claim 8, and further comprising the step of:

removing the support structure from the model by breaking-away the support structure from the model while the materials are heated to a temperature above about 150° C.

10. An additive-process method for building a three-dimensional object comprising the steps of:

dispensing a solidifiable modeling material in a flowable state into a heated build chamber in a predetermined pattern so as to define the three-dimensional object;

dispensing a solidifiable support material in a flowable state into the heated build chamber in coordination with the dispensing of the modeling material, so as to create a support structure for the three-dimensional object, said support material selected so as to adhere to the modeling material while the object is under construction; and removing the support structure from the object after the object is built;

wherein the modeling material is a thermoplastic consisting essentially of a blend of polyphenylsulfone, polycarbonate, and, optionally, additives, and wherein the weight percent of polyphenylsulfone in the blend is between about 70 percent and 99 percent, and the weight percent of polycarbonate in the blend is between 1 percent and 25 percent.

11. The method of claim 10, wherein the step of removing the support structure comprises:

breaking-away the support structure from the object while the materials are heated to a temperature above about 150° C.

12. The method of claim 10, wherein the build chamber is heated to between about 200° C. and 235° C.

13. The method of claim 12, wherein the step of removing the support structure comprises:

breaking-away the support structure from the object while the materials are at the build chamber temperature.

14. The method of claim 13, wherein the step of removing the support structure further comprises:

heating the object and the support structure as needed until removal is complete.

15. The method of claim 14, where the heating is done in a microwave oven.

16. The method of claim 10, wherein the weight percent of polycarbonate in the blend is about 10 percent and the weight percent of polyphenylsulfone in the blend is least 80 percent.

17. The method of claim 16, wherein the weight percent of polyphenylsulfone in the blend is about 90 percent.

18. The method of claim 10, wherein the thermoplastic modeling material has a glass transition temperature of greater than 220° C.

19. The method of claim 10, and further comprising the step of:

supplying a feedstock of the thermoplastic modeling material in the form of a flexible filament.

20. The method of claim 10, wherein the support material is a thermoplastic comprising a polyethersulfone base polymer and a silicone release agent.

21. The method of claim 20, wherein the support material further comprises a high-impact polystyrene.

22. The method of claim 21, wherein polyethersulfone comprises between about 90–95 weight percent of the support material, high-impact polystyrene comprises between about 3–8 the weight percent of the support material, and silicone comprises between about 1–3 weight percent of the support material.

23. An additive-process method for building a three-dimensional object comprising the steps of:

dispensing a thermoplastic modeling material in molten form into a heated build chamber in a predetermined pattern so as to define the three-dimensional object;

dispensing a thermoplastic support material in molten form into the heated build chamber in coordination with the dispensing of the modeling material, so as to create a support structure for the three-dimensional object, said support material selected so as to bond to the modeling material while the object is under construction; and removing the support structure from the object after the object is built by breaking-away the support structure from the model while the materials are heated to a temperature above about 150° C.

24. The method of claim 23, wherein the build chamber is heated to between about 200° C. and 235° C.

25. The method of claim 24, wherein the support structure is removed while the materials are at the build chamber temperature.

26. The method of claim 25, and further comprising the step of:

heating the object and the support structure in an external oven as needed until removal is complete.

27. The method of claim 23, and further comprising the step of:

heating the object and the support structure to above about 150° C.

28. The method of claim 27, and further comprising the step of:

re-heating the object and the support structure as needed until removal is complete.

29. The method of claim 28, wherein the object and the support structure are heated in a microwave oven.

30. The method of claim 23, wherein the support structure is broken-away from the model using hand tools selected from the group consisting of a pliers, a straight chisel, a hook chisel, an awl, a hook awl, and a gouge.

31. The method of claim 23, wherein the thermoplastic modeling material consists essentially of a blend of polyphenylsulfone, polycarbonate, and, optionally, additives, wherein the weight percent of polyphenylsulfone in the blend is between about 70 percent and 99 percent, and the weight percent of polycarbonate in the blend is between 1 percent and 25 percent.

32. The method of claim 31, wherein the weight percent of polycarbonate in the blend is about 10 percent and the weight percent of polyphenylsulfone in the blend is least 80 percent.

33. The method of claim 32, wherein the weight percent of polyphenylsulfone in the blend is about 90 percent.

34. An additive method for building a three-dimensional object with a support structure, the method comprising:
- depositing a modeling material in a flowable state, the modeling material comprising a polyphenylsulfone compound and a polycarbonate compound, wherein the modeling material is used to build the three-dimensional object;
- depositing a support material in a flowable state, wherein the support material is used to build the support structure; and
- removing the support structure from the three-dimensional object after the three-dimensional object is built.

35. The method of claim 34, wherein:
- the polyphenylsulfone compound constitutes about 70% to about 99% by weight of the modeling material; and
- the polycarbonate compound constitutes about 1% to about 25% by weight of the modeling material.

36. The method of claim 35, wherein the polyphenylsulfone compound constitutes at least about 90% by weight of the modeling material.

37. The method of claim 34, wherein the modeling material has a glass transition temperature of at least 220° C.

38. The method of claim 34, wherein the modeling material further comprises an additive selected from a group consisting of a filler, a silicone compound, a plasticizer, a dye, a pigment, an antioxidant, and combinations thereof.

39. The method of claim 34, wherein the support material comprises a thermoplastic material and a silicone compound.

40. The method of claim 39, wherein the thermoplastic material of the support material is selected from a group consisting of a polyethersulfone compound, a high-impact polystyrene compound, and combinations thereof.

41. The method of claim 34, and further comprising drying the modeling material.

42. The method of claim 34, wherein the support structure is removed from the three-dimensional object by breaking away the support structure from the three-dimensional object while the modeling material and the support material are above a temperature above about 150° C.

43. The method of claim 34, and further comprising supplying a feedstock of the modeling material, wherein the modeling material is in a filament form.

* * * * *

UNITED STATES PATENT AND TRADEMARK OFFICE
CERTIFICATE OF CORRECTION

PATENT NO. : 6,869,559 B2
DATED : March 22, 2005
INVENTOR(S) : Paul E. Hopkins

It is certified that error appears in the above-identified patent and that said Letters Patent is hereby corrected as shown below:

Column 11,
Line 16, delete "polyphenylsulfoflein", insert -- polyphenylsulfone in --

Signed and Sealed this

Second Day of August, 2005

JON W. DUDAS
*Director of the United States Patent and Trademark Office*